United States Patent [19]
Klaus

[11] Patent Number: 6,086,353
[45] Date of Patent: *Jul. 11, 2000

[54] TWO-STAGE ELECTRIC INJECTION UNIT WITH ROTATING PLUNGER

[75] Inventor: M. Barr Klaus, Cincinnati, Ohio

[73] Assignee: Cincinnati Milacron Inc., Cincinnati, Ohio

[ * ] Notice: This patent is subject to a terminal disclaimer.

[21] Appl. No.: 09/024,731

[22] Filed: Feb. 17, 1998

[51] Int. Cl.7 .................................................... B29C 45/70
[52] U.S. Cl. ........................... 425/145; 425/557; 425/558; 425/560
[58] Field of Search .................................... 425/145, 557, 425/558, 560

[56] References Cited

U.S. PATENT DOCUMENTS

| | | | |
|---|---|---|---|
| 3,861,841 | 1/1975 | Hanning | 425/146 |
| 4,290,701 | 9/1981 | Schad | 366/77 |
| 4,722,679 | 2/1988 | Farrell | 425/146 |
| 4,734,243 | 3/1988 | Kohama et al. | 264/328.8 |
| 4,758,391 | 7/1988 | Shimizu et al. | 264/40.5 |
| 5,281,384 | 1/1994 | Banks | 264/297.2 |
| 5,454,995 | 10/1995 | Rusconi et al. | 264/328.8 |
| 5,606,707 | 2/1997 | Ibar | 425/144 |
| 5,863,567 | 1/1999 | Klaus | 425/557 |

*Primary Examiner*—Tim Heitbrink
*Attorney, Agent, or Firm*—Stephen H. Friskney

[57] ABSTRACT

The invention is directed to a two-stage, all-electric injection unit. More specifically, an injection unit in which the feed screw is preferably used only for plastication and the injection of the plasticized material is accomplished by a separate accumulator having an electrically driven linear actuator, such as a ball screw mechanism. The plunger of the accumulator is configured with a helical flight and is rotatable by way of a one-way clutch interposed between the plunger and the ball screw.

9 Claims, 3 Drawing Sheets

TWO-STAGE ELECTRIC INJECTION UNIT WITH ROTATING PLUNGER

BACKGROUND OF THE INVENTION

1. Field of the Invention

The present invention relates generally to molding machines and, more particularly, to a two-stage electric injection unit for an injection molding machine.

2. Description of the Related Art

The injection unit of an injection molding machine provides essentially two functions during the course of a normal cycle of operation; namely, injection and extruder. In a standard reciprocating screw injection molding machine, the extruder function is accomplished when the screw is rotated, gradually moving plastic melt toward the forward end of the screw, thereby creating a pressure or force to move the screw rearward to its pre-injection position as the melt accumulates. When a sufficient amount of material is accumulated ("a shot"), the screw is moved rapidly forward (without rotation) to inject the melt straight into the mold, thus performing the injection function.

The injection unit of a molding machine can also be designed as a "two-stage" system where the extruder and injection functions are performed by separate machine elements. In a two-stage injection system, the extruder or plasticizing function is still performed by a feed screw in a heated barrel, but the plastic melt is diverted into an "accumulator" (usually positioned adjacent the plasticizing barrel) rather than being conveyed from the barrel directly to the mold cavity. The accumulator is subsequently operated to perform the injection of plastic melt into the mold. The advantages of a two-stage injection unit include more uniform plastication of material, reduced wear on the screw and barrel, and the potential for higher injection pressures. The primary disadvantages are higher unit cost and material carryover from shot-to-shot that can affect part quality. More specifically, when thermoplastic material is maintained in a fluid state (above melt temperature) for an extended period, its properties will degrade to varying extents depending on the type of material, the temperature of the melt and the time it is held at the elevated temperature. The construction of the accumulator and internal piston generally determines how much material remains in the accumulator after the shot is injected into the mold.

In either type of system, the injection and extruder functions each require an associated drive apparatus in the injection unit. In hydraulic machines, movement of the screw for the injection function is typically performed by one or more hydraulic cylinders, while the rotation of the feed screw for extruder run is normally accomplished by a hydraulic motor. More recently, electric motors combined with mechanical systems have been used as the direct power source for reciprocating screw injection units. Notably, these prior art electric systems have used separate motors for each function; i.e., one motor for rotating the feed screw and a second motor in combination with a mechanism, such as a ball screw, to convert rotary motion into the linear movement required to move the screw forward for injection.

Accordingly, as is typical when new technology is applied to existing products, the effort has been to maximize the execution of the previous injection system technology so as to limit risk and retain product identity. This is especially true in all-electric injection molding machine design where hydraulic motion control has been replaced with electromechanical motion control. As a result of this limited design approach, many important advantages of electric variable speed motor drives have not been realized in their application to injection molding.

For example, it is generally known that the hydraulically driven reciprocating screw injection unit design has a shot size consistency and repeatability capability of approximately ±0.2%, due to hydraulic system fluctuations mentioned above and inconsistency of the non-return valve at the end of the screw (the non-return valve is a necessary component to the proper functioning of the reciprocating screw design). Given that all of the all-electric machines in the market today have a reciprocating screw, the potential for reducing shot size variation has been limited to the improvement of positioning repeatability of screw forward axis alone.

It is well established that simply replacing hydraulic drive trains with electromechanical drive trains provides significant, measurable improvement in repeatability, stability, and accuracy of the driven device. This is a result of reducing the number of components in the drive train, elimination of inherent variations in the hydraulic fluid as a function of temperature, viscosity changes due to ultimate chemical breakdown of the oil itself, eventual increasing concentration of contaminants, and so forth. However, while simply replacing the hydraulic drive train components with servo-electrical/mechanical components provides desirable performance improvement, the full potential improvement has yet to be realized.

The potential for improvement is particularly evident in reciprocating screw injection units having relatively large shot capacity. While the increased shot size is relatively simple in reciprocating screw hydraulic machines, the substitution of electric motors and ball screws for hydraulic cylinders ultimately becomes impractical due to the excessive cost of the large ball screws required (to reciprocate the screw for injection). Although the size of the ball screws can be reduced by using two screws in tandem, the costs for the screws and associated components remain excessively high. In addition, the construction of electric reciprocating screw injection units that have capacities to match the range of hydraulic units available would require ball screws of sizes that are untested and, in fact, exceed current manufacturing capabilities.

In addition, the processing requirements for injection molding commercially significant plastics materials involve injection pressures of at least 15,000 psi, and frequently up to 30,000 psi. Given that availability and cost of ball screws are more affected by diameter rather than length, ball screws in excess of six inches in diameter are virtually unavailable in commercial quantities—which has severely limited the advance of all-electric designs beyond about 32 ounces shot capacity. For example, a typical 100 ounce shot capacity hydraulic injection unit would have a reciprocating screw of about 4 inches in diameter to generate 20,000 psi. An all-electric (reciprocating screw) equivalent would need a ball screw far in excess of six inches in diameter to carry the load. In fact, the largest commercially produced all-electric injection unit in the world today uses two ball screws 6.5 inches in diameter to support the load requirements of a 3.5 inch diameter reciprocating screw operating to inject up to 77 ounces of melt at a maximum injection pressure of 22,000 psi.

Ball screw performance and durability suffer in reciprocating screw injection applications. To get optimum useful life from the ball screw, minimum levels of ball circulation and lubrication circulation must be accomplished. However, the reciprocating screw design is limited to relatively short injection stroke, because longer strokes induce unacceptable plastic processing variations that result from the decreasing effective screw length to diameter ratio (L/D) as the screw retracts while building the shot volume for injection. By current standards, rarely does the injection stroke exceed five times the screw diameter in a reciprocating screw design. Furthermore, prior art (hydraulic) two-stage injection units have adhered to roughly the same ratio for the stroke and diameter of the accumulator piston.

Typically, the size of the "shot" processed in most reciprocating screw injection units would probably be about 25% of the maximum. (This results from the fact that the screw is sized by plasticizing requirements rather than shot capacity.) Using the 25% limitation for purposes of illustration, in a reciprocating screw, all-electric injection unit, maximum ball screw travel would likely be limited to one screw diameter or less for a majority of the machine's service life. Ball screw leads are typically one-fourth to one-half the diameter of the ball screw and are usually designed to have at least three complete thread revolutions under load. For example, if an injection unit is traversing one screw diameter for injection, and the injection axis ball screw is twice the diameter of the injection screw, the loaded balls in the mechanism never fully circulate to unloaded positions and some of the unloaded ball do not move to a loaded position. This results in uneven wear of the components and the natural lubrication that would occur from complete circulation of the balls must be supplanted with frequent, external lubrication. Accordingly, ball screw life in a reciprocating screw injection unit is less than it would be in an application where there is full circulation of the balls.

It should be noted that the relatively large diameter and short stroke of the reciprocating screw injection unit facilitates high speed injection; however, a high torque motor is required to produce the desired injection pressures. Since horsepower is a function of the product of motor torque and RPM, the high torque requirement means that high horsepower motors are required to drive the injection mechanism, Another consideration is that the floor space occupied by an injection molding machine has become an increasingly important criteria. As the resources once available for facilities are diverted to other assets to increase productivity, the length, width and height of a machine has become increasingly important consideration among competing machine designs. In all-electric machines, the injection ball screw is most advantageously arranged in line behind the injection piston. In the case of the reciprocating screw, the plasticizing screw is the injection piston, and already has a length that is fifteen to thirty times its diameter because of plasticizing requirements. Since it generally desirable to lengthen injection stroke as much as possible, positioning a ball screw in-line with the plasticizing screw for the injection stroke results in a machine of undesirable overall length.

Besides the need for increased capacity in electric injection units, there is potential for improvement in durability, repeatability, stability, and accuracy of the driven device, as well as a reduction in overall length of the machine, if a way can be found to overcome the obstacles presented by limiting application of electro-mechanical technology to reciprocating screw injection units. Furthermore, in order to take full advantage of the desired improvements, a new construction for an electric injection unit should not introduce the material carryover problems typically associated with prior art two stage injection units.

SUMMARY OF THE INVENTION

Accordingly, it is an object of the present invention to provide a drive apparatus for an all-electric injection unit that is simple in construction, is more durable, improves shot accuracy and effectively enables increased shot capacity. It is a further object of the invention to apply variable speed electric drive technology to two stage injection units in a way that improves operating efficiency and reduces material carryover with respect to prior art systems.

In accordance with these objectives, the invention is directed to a two-stage, all-electric injection unit in which the feed screw is used primarily for plastication and a melt accumulator is used for injection. Preferably, the feed screw is capable of rotation only and does not reciprocate, which will reduce the overall length of the machine. The injection of the plasticized material is accomplished by a separate melt accumulator having a plunger with a helical flight that is reciprocated by an electrically driven linear actuator, such as a ball screw mechanism. Preferably, there are separate motors for rotation of the feed screw and operation of the accumulator, allowing the drive system for the plunger to also provide rotation of the plunger by means of a one-way clutch interposed between the ball screw and plunger. The disclosed two-stage construction is particularly suited for large capacity injection units (greater that 80 ounces) where the large ball screws needed to reciprocate the feed screw in the prior art result in excessive costs.

Although two-stage injection units have been used on hydraulically powered injection molding machines for many years, they have not been used on electric machines since the advantages provided by two stage units on hydraulic machines have been largely accomplished by the application of all-electric drive technology to reciprocating screw units. The invention of the two-stage electric injection unit goes beyond the apparent advantageous and economic use of standard injection unit components that has occurred in the prior art. In the disclosed embodiment, the invention enables performance capabilities that are presently unattainable with existing hydraulic or electro-mechanical injection unit technology.

By optimizing the length of stroke and diameter of the accumulator piston, the invention achieves important advantages of an all-electric machine design that have not been previously realized. Since the diameter of the piston dictates the load carrying requirements for the mechanism that converts the rotary motion of the motor into linear motion for the piston, larger shot capacities can be accomplished with the two-stage design by providing increased length of stroke at relatively small piston diameters. For example, a two-stage electric injection unit according to the present invention could have an injection (accumulator) capacity of 150 ounces (2.75 inch diameter piston, 46 inch stroke) and be capable of operating at 20,000 psi with a 5.5 inch diameter ball screw (which is commercially available). This diameter of ball screw in prior art all-electric injection molding machines would typically have a shot capacity of only about 30 ounces (2.75 inch diameter screw, 9 inch stroke). Accordingly, the invention expands the shot capacity by about five times without adding the risk, cost, and space requirements for the larger ball screws required for a reciprocating screw design.

Further advantages of lengthening injection stroke for a desired shot capacity include increased ball screw performance and durability. In particular, the use of an accumulator in the two-stage design provides the ability to optimize the shot cylinder diameter (of the accumulator) independent of the plasticizing screw diameter. Thus, the system can be designed to provide sufficient traverse of the ball screw mechanism to improve loading and circulation of the balls, improving lubrication and increasing the service life. The smaller diameter means that less horsepower is required for a given shot capacity. Although the ratio of the stroke to piston diameter might decrease to around 10 for high speed injection, the smaller diameter facilitates injection at desired pressure levels with a lower horsepower motor.

With the described construction for the accumulator and plunger, material carryover is essentially limited to only one cycle. When thermoplastic melt is fed into the accumulator by the extruder, the ball screw in the plunger drive mechanism is rotated to control the rearward movement of the plunger, and thus control the back pressure on the melt. The ball screw rotation is imparted to the plunger by means of a one-way clutch. More specifically, the thermoplastic melt enters the accumulator at a point where it wipes away melt remaining in the flight of the plunger from the previous shot. This flow of new melt moves the carryover material in front of the plunger and at the end of the accumulator where it will be the first out in the subsequent shot. This virtually eliminates material carryover thereby minimizing material degradation and greatly reducing the time requires to purge one color of material and change to a new color of material.

The all-electric two stage injection unit design of the present invention also solves the problem of excessive machine length. In particular, the plasticizing screw length is disassociated from the injection stroke and corresponding ball screw length. This is accomplished by independent support of these two elements (plasticizing screw and ball screw) on different center lines, thus providing a machine that is compact in length without adding additional width or height.

Another advantage of the disclosed two-stage injection unit configuration is that it enables the extruder screw to be gear driven rather than belt driven. The belt and pulley systems are somewhat limited because of the strength of belts or the number of belts required to deliver torque to larger plasticizing screws when they are driven off-center. Moving the injection function away from the plasticizing screw axis allows access to hard-couple a mechanical speed reduction gear box to the screw. This is not possible in an all-electric reciprocating screw injection unit where the injection ball screw is in line with the plasticizing screw.

The two-stage all-electric design of the present invention makes possible all-electric injection units with shot capacities far exceeding those of conventional, all-electric reciprocating screw units. As such, electric two stage injection units of the present invention have greater potential machine applications by providing benefits and performance gains relating to improved repeatability, material stability, and shot size accuracy. More particularly, the two-stage injection unit offers further advantages over the prior art by eliminating the need for a non-return valve at the end of the screw, being able to separate the shot size from plasticizing requirements, and allowing the use of a smaller diameter injection piston (as compared to the screw diameter) for more precise control of shot size.

Overall, the present invention provides an all-electric injection unit having enhanced capabilities, including increased shot capacity, improved shot control, minimal carryover and faster color changes, when compared to prior art electrically driven injection systems.

DESCRIPTION OF THE PREFERRED EMBODIMENT

The present invention relates to a two-stage electric injection unit 14 for an injection molding machine; as such, it will be described in the context of a typical machine. Since the general structure and operation of injection molding machines are well known, those aspects of the apparatus which are different or take on a new use with respect to two-stage electric injection will receive primary emphasis.

Figure 1:
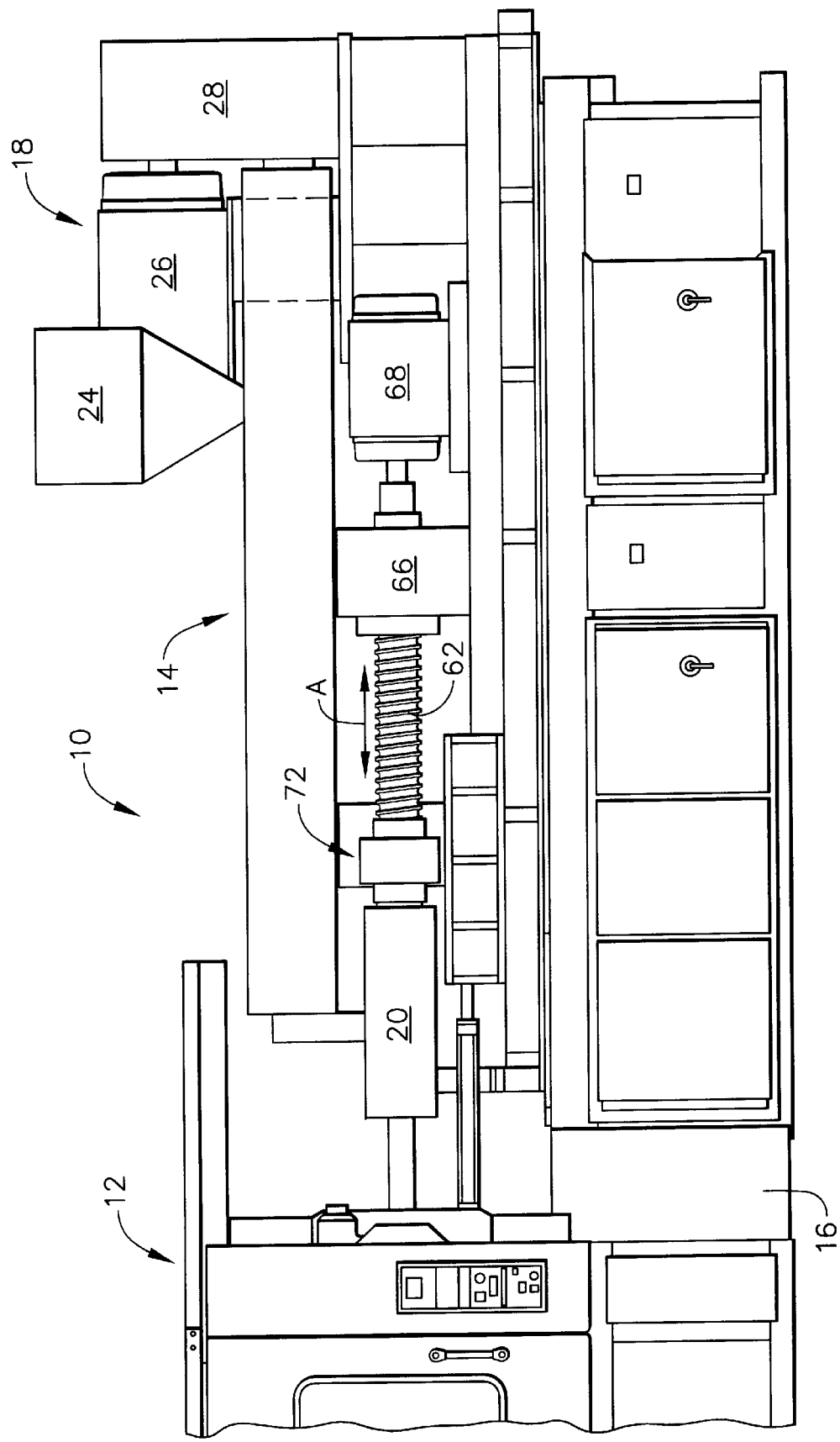
FIG. 1 is a fragmentary, side elevational view of an injection molding machine having a two-stage electric injection unit according to the present invention.
Figure 2:
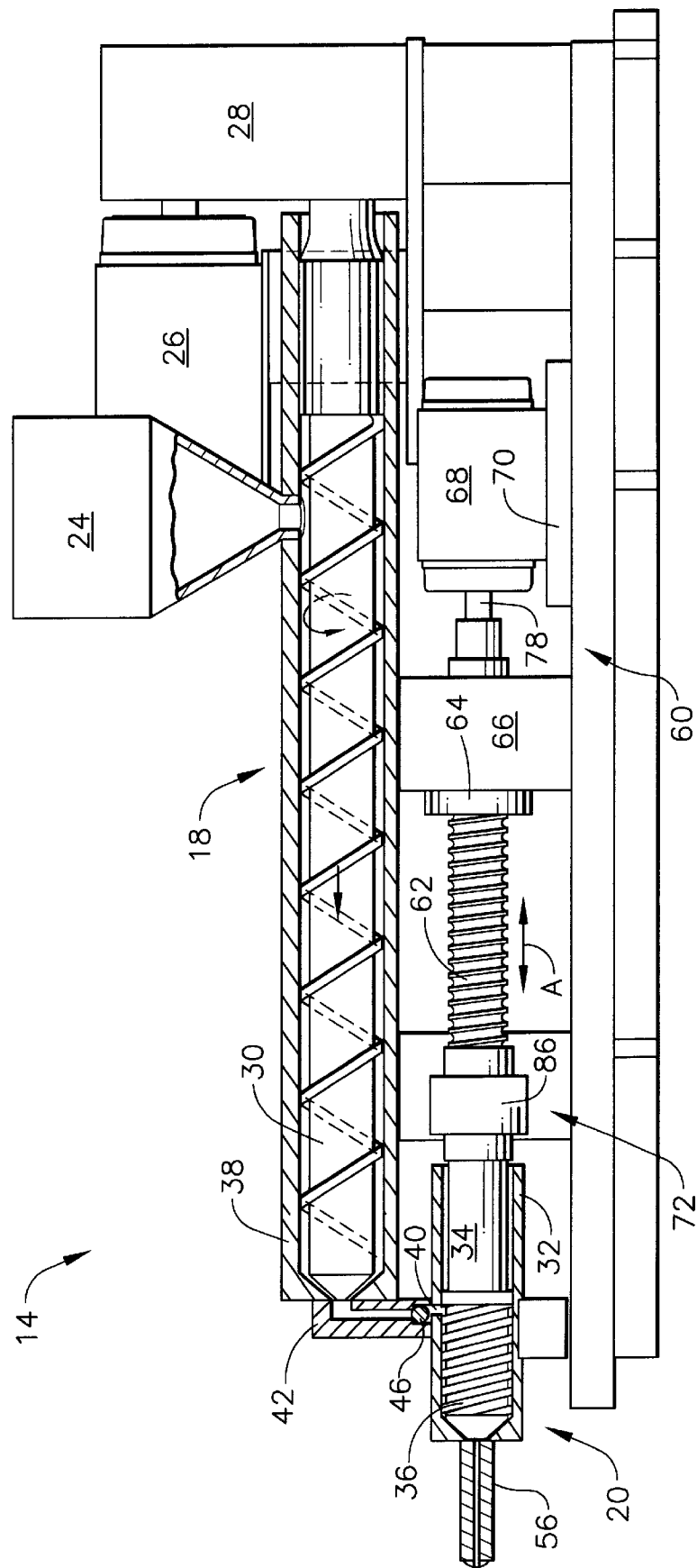
FIG. 2 is an enlarged view, partially in section, of the two-stage electric injection unit of the molding machine illustrated in FIG. 1.

The apparatus of the present invention is used in conjunction with an injection molding machine 10, as shown in FIGS. 1 and 2. The general configuration of the molding machine 10 includes a conventional clamp unit 12, and a two-stage electric injection unit 14, both of which are mounted on an elongated support or base 16. The components of the injection unit 14 are specifically designed to implement electric motor drive technology in a two-stage injection unit. Preferably, the primary elements are an electrically driven extruder 18 and a melt accumulator 20. The extruder 18 is intended for continuous plasticizing and, therefore, has a non-reciprocating feed screw 30 (see FIG. 2). If desired, however, the concepts of the present invention can also be applied to a two-stage injection system with a reciprocating feed screw.

As is generally known in the art, material is supplied to the extruder in any convenient manner, such as by a hopper 24. The rotational power for the screw 30 is also provided in a conventional manner, as by an electric motor 26, connected to a speed reduction gearbox 28 that drives the screw 30. Since the movement of the screw 30 is rotational only, the drive system is greatly simplified over the injection units having a screw which must also reciprocate.

The accumulator 20 is essentially a variable volume reservoir by virtue of a cylindrical barrel 32 containing a plunger 34 that is capable of both rotational and linear movement within the barrel 32. Note that the end of the plunger 34 has a helical flight 36. The relative size of the barrel 32 and plunger 34, as well as the stroke of the plunger 34, will vary according to the quantity of melt required to fill the mold. In the constriction of melt accumulator 20, it is desirable to configure the end-shape of the barrel 32 and plunger 34 in a way that minimizes the amount of resin remaining in the barrel 32 when the plunger 34 is fully extended, as will be more fully discussed later.

By optimizing the length of stroke and diameter of the plunger 34 important advantages of an all-electric machine design can be realized. The diameter of the plunger 34 dictates the load carrying requirements for the ball screw that converts the rotary motion of the motor into linear motion for the plunger 34. However, the larger shot capacities can be easily accomplished with the two-stage design by providing increased length of stroke at relatively small diameters. For example, the disclosed two stage design yields an injection capability of at least 150 oz. at a 2.75 inch diameter plunger 34 that can operate at 20,000 psi with a 5.5 in diameter ball screw; in contrast, prior art all-electric injection molding machines with these design criteria would typically have a shot capacity of only about 30 oz.

In sizing the components of melt accumulator 20, the advantages of the invention are more fully realized when ratio of the full stroke of the plunger 34 to the diameter of the plunger 34 (this criteria is similar to the L/D of a reciprocating screw) is five or higher; the range of ten to fifteen for this ratio is believed to be particularly advantageous. This configuration of the accumulator 20 would enable use of commercially available ball screws, while providing a longer stroke (improving shot size accuracy and repeatability) at higher injection pressures.

The outlet of the extruder 18 connects to accumulator 20 via a suitable conduit 42. At a convenient point between the extruder 18 and the inlet 40 to the accumulator 20, a ball check valve 46 or other suitable non-return device is provided to control the direction of the flow through conduit 42. When the accumulator 20 is activated to inject plastic into the mold cavity and maintain pressure during pack and hold, the check valve 46 prevents a back-flow of melt into the extruder 18 due to the pressure differential. The outlet of the accumulator 20 is connected to the injection mold (not shown) via a suitable nozzle 56.

Figure 3:
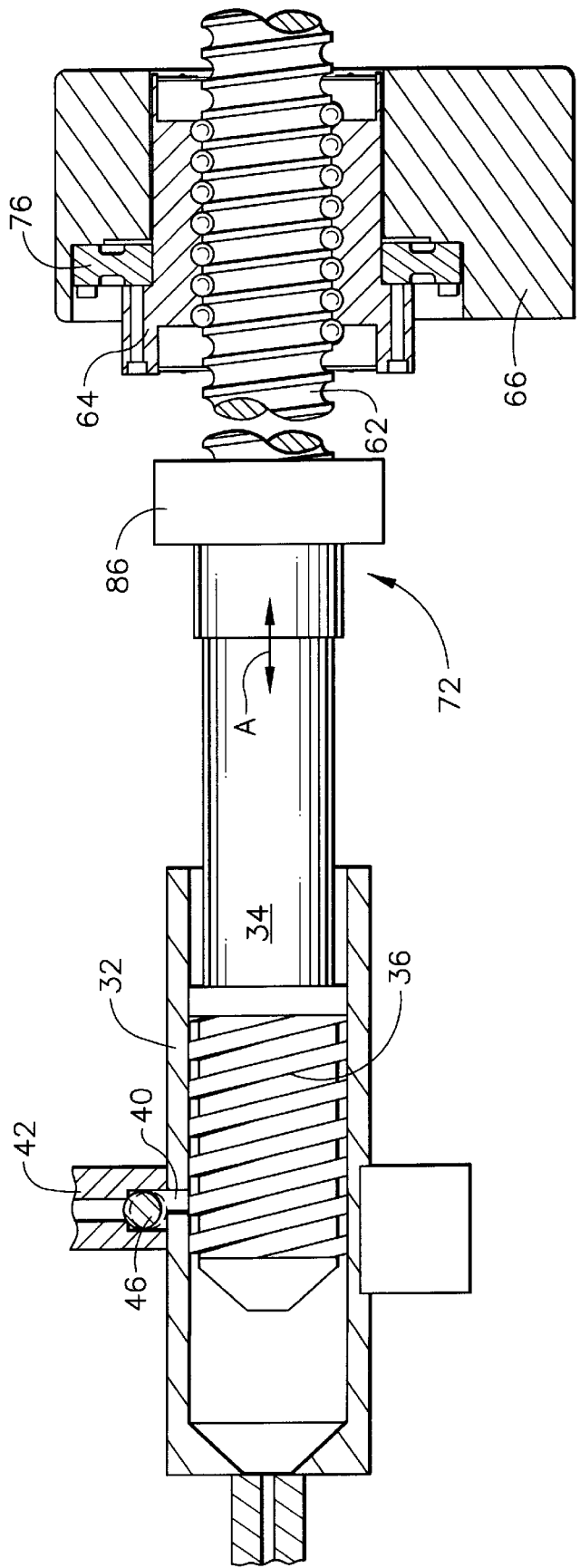
FIG. 3 is a more detailed, enlarged view, of the injection unit illustrated in FIG. 2, focusing on the melt accumulator and mechanical drive elements.

The plunger 34 of accumulator 20 is preferably actuated by an electromechanical drive assembly 60, see FIGS. 2 and 3. The drive assembly 60 preferably includes a ball screw 62, a ball nut 64 with support housing 66, a variable speed electric motor 68 and a motor support 70 that allows for linear movement of the motor 68. More specifically, the ball nut 64 is preferably carried within support housing 66 and is restrained from rotation by its attachment to housing 66 through suitable means, such as a load cell 76. The driven end of the ball screw 62 connects to the motor shaft 78; the opposite end of the screw 62 connects to the plunger 34 of the accumulator 20 by means of a coupling 72. Preferably, the coupling 72 includes a one-way clutch 86 that allows the ball screw 62 to rotate freely with respect to the plunger 34 during injection (clockwise rotation of screw 62) to transmit efficiently linear (horizontal) force from the ball screw 62 to the plunger 34 without adversely affecting the melt contained in the accumulator 20. However, reverse (counter-clockwise) rotation of the ball screw 62 engages the one-way clutch 86 causing the plunger 34 to rotate within the cylinder 32.

Since the shaft 78 of the motor 68 attaches directly to the ball screw 62, the motor 68 must be able to reciprocate back and forth as the ball screw 62 is used to move the plunger 34. Accordingly, the support 70 for the motor 68 is configured to provide stability for the motor 68 while allowing it to move linearly in a direction parallel to the movement of the plunger 34, as indicated by arrow A. Of course, it is also conceivable that the connection of motor shaft 78 to ball screw 62 could be accomplished via an elongated spline coupling, allowing a stationary mounting of the motor 68 at a position more rearward from that shown.

A cycle of operation of the injection molding machine 10, incorporating the two-stage injection unit 14 of the present invention will now be described. The feed screw 30 is rotated within barrel 38 by the extruder motor 26 to begin plastication of the material that will be supplied as plastic melt to the accumulator 20. The rotation of the screw 30 builds pressure at the end of the screw 30, moving (opening) the ball check valve 46 and causing material to flow through the conduit 42 and into the accumulator 20.

The inlet 40 of accumulator 20 is positioned so that melt flowing into the barrel 32 will pass over the flight 36 at the end of plunger 34. The incoming melt will flow along the flight 36, cleaning out melt carried over from the previous shot and moving it toward the outlet end of barrel 32, causing the pressure in the accumulator 20 to build. When the pressure of the plastic melt reaches a certain level, it will begin to force the plunger 34 rearwardly, thereby moving the ball screw 62 and motor 68 toward the rear of injection unit 14 (support housing 66 remains stationary), see FIG. 3. The rearward movement of plunger 34 applies a force to ball screw 62 through coupling 72, causing ball screw 62 to move likewise to the rear; as the ball screw 62 moves through ball nut 64 it rotates in a reverse (counter-clockwise) direction. This reverse rotation of the ball screw 62 is imparted to the plunger 34 via engagement of the one-way clutch 86. The rotation of plunger 34 further aids in cleaning carry-over material from the flight 36 by enhancing the wiping action of the inflow of new melt.

If desired, the rate of rearward movement of the plunger 34 (and ball screw 62) can be controlled by the motor 68. In particular, the motor 68 can be used as a brake to impede the rotation of ball screw 62, which slows the rearward movement of the plunger 34, thereby increasing the back pressure of the plastic melt. Alternatively, the motor 68 can be used to speed up the rotation and rearward movement of the ball screw 62, which increases the rate at which the plunger 34 moves back, thereby decreasing the back pressure of the melt. In either case, the rotational speed of the ball screw 62 is imparted to the plunger 34 by clutch 86.

The extrusion function is complete and rotation of the feed screw 30 is stopped when a sufficient charge of plastic melt is accumulated in front of the plunger 34 in the accumulator 20, as required to fill the cavity of the mold. Concurrently with the extrusion function, the clamp unit 12 has been operated to close and build pressure on the mold that will receive the plastic melt.

To initiate the injection function, the motor 68 is rotated in a clockwise direction causing the ball screw 62 to advance through ball nut 64 which is constrained by support housing 66. The translational (linear) movement of screw 62 is imparted to the plunger 34 housed in the accumulator 20. However, the rotation of the screw 62 is not imparted to the plunger 34 since the one-way clutch 86 is disengaged when the screw 62 rotates in the clockwise direction. Except for an assembly having a stationary motor mounting, as described above, the motor 68 will also have translational movement (since it is part of the same assembly) along with the ball screw 62 as the plunger 34 is moved linearly in the cylinder 32 of the accumulator 20.

The forward movement of the plunger 34 causes the accumulated plastic melt to be forced through the nozzle 56 and into the mold cavity. The injection pressure generated by movement of the plunger 34 moves the ball check valve 46 to a position that prevents transfer of the melted resin into the extruder 18. After the bulk of material is transferred into the mold cavity, the injection accumulator 20 initiates pack, then hold, to maintain the proper pressure on the material until the molded part is properly formed. When the injection accumulator 20 reaches the "hold" portion of the cycle, it has emptied itself of material. In other words, the injection of plastic melt is accomplished by applying sufficient force to move the plunger 34 rapidly forward in the cylinder 32, forcing the melt to flow through the outlet of the injection accumulator 20, on through the nozzle 56, then into the mold. This approximate point in the cycle can be identified by the configuration shown in FIG. 2; the plunger 34 in the accumulator 20 is fully forward in the barrel 32, having completed the injection function.

As part of the injection process, it is highly desirable to avoid "dead" spots in the material flow path where plastic melt can remain stationary through repeated cycles, allowing it to degrade, possibly later mixing with good material and injected to form a poor quality part. Accordingly, a mating configuration between the end of the plunger 34 and the outlet of the barrel 32 will minimize the amount of material remaining in the accumulator 20 after the shot is completed. The only significant carry-over material is in the flight 36 which is wiped clean by the inflow of new melt and rotation of the plunger 34 as the subsequent shot accumulates (and is injected into the mold during the next cycle of operation).

After sufficient hold/cool time, the pressure held by the injection accumulator 20 is released during mold decompress, which may include a slight retraction of the plunger 34. The clamp 12 operates to open the mold, eject the part(s), then re-close to begin a subsequent cycle. As soon as the pressure by plunger 34 is released, the injection unit 14 starts rotation of the feed screw 30 to initiate the extrusion function as described previously and begin another cycle of operation.

While the invention has been illustrated in some detail according to the preferred embodiment shown in the accompanying drawings, and while the preferred embodiment has been described in some detail, there is no intention to thus limit the invention to such detail. On contrary, it is intended to cover all modifications, alterations, and equivalents falling within the spirit and scope of the appended claims. For example, although the drive couplings are generally described as belts and pulleys, other mechanical couplings, such as suitable gearing, can be used to perform the same function. In addition, other systems or mechanisms can be used to impart linear motion to the accumulator plunger 34; such as, a roller screw and nut in place of the ball screw and ball nut as described.

What is claimed is:

1. An injection molding machine including an injection unit comprising:

a feed screw capable of rotational movement within a barrel having an inlet and an outlet, rotational drive means including a variable speed electric motor, for rotating the feed screw within the barrel in order to plasticize and convey material from the barrel inlet to the barrel outlet, a melt accumulator having a plunger received within a cylindrical chamber connected to receive plasticized material from the barrel outlet; and plunger drive means including a mechanism driven by an electric motor, for imparting translational and rotational movement to the plunger of the accumulator, thereby controlling the position of the plunger in the cylindrical chamber of the accumulator.

2. The injection molding machine of claim 1 wherein the mechanism of the plunger drive means comprises a ball screw mechanism coupled to the plunger of the accumulator.

3. The injection molding machine of claim 1 wherein the mechanism of the plunger drive means comprises a roller screw mechanism coupled to the plunger of the accumulator.

4. The injection molding machine of claims 2 or 3 wherein the mechanism of the plunger drive means further comprises a one-way clutch interposed between the screw mechanism and the plunger of the accumulator.

5. The injection molding machine of claim 1 wherein the plunger of the accumulator is generally cylindrical in shape and is capable of traversing a defined length of stroke, such that the ratio of the stroke of the plunger to the diameter of the plunger is at least five.

6. The injection molding machine of claim 5 wherein the ratio of the stroke of the plunger to the diameter of the plunger is between ten and fifteen.

7. The injection molding machine of claim 1 wherein at least a portion the plunger of the melt accumulator has a helical flight.

8. The injection molding machine of claim 7 wherein the mechanism of the plunger drive means comprises a screw mechanism coupled to the plunger of the accumulator.

9. The injection molding machine of claim 8 wherein the mechanism of the plunger drive means further comprises a one-way clutch interposed between the screw mechanism and the plunger of the accumulator.

* * * * *